INVENTOR.
CHARLES R. FISHER

Jan. 10, 1956 C. R. FISHER 2,730,578
IMPULSE TESTING EQUIPMENT
Filed June 25, 1952 5 Sheets-Sheet 4

| FIG. 1 | FIG. 2 | FIG. 3 |

*INVENTOR.*
CHARLES R. FISHER
*ATTORNEY*

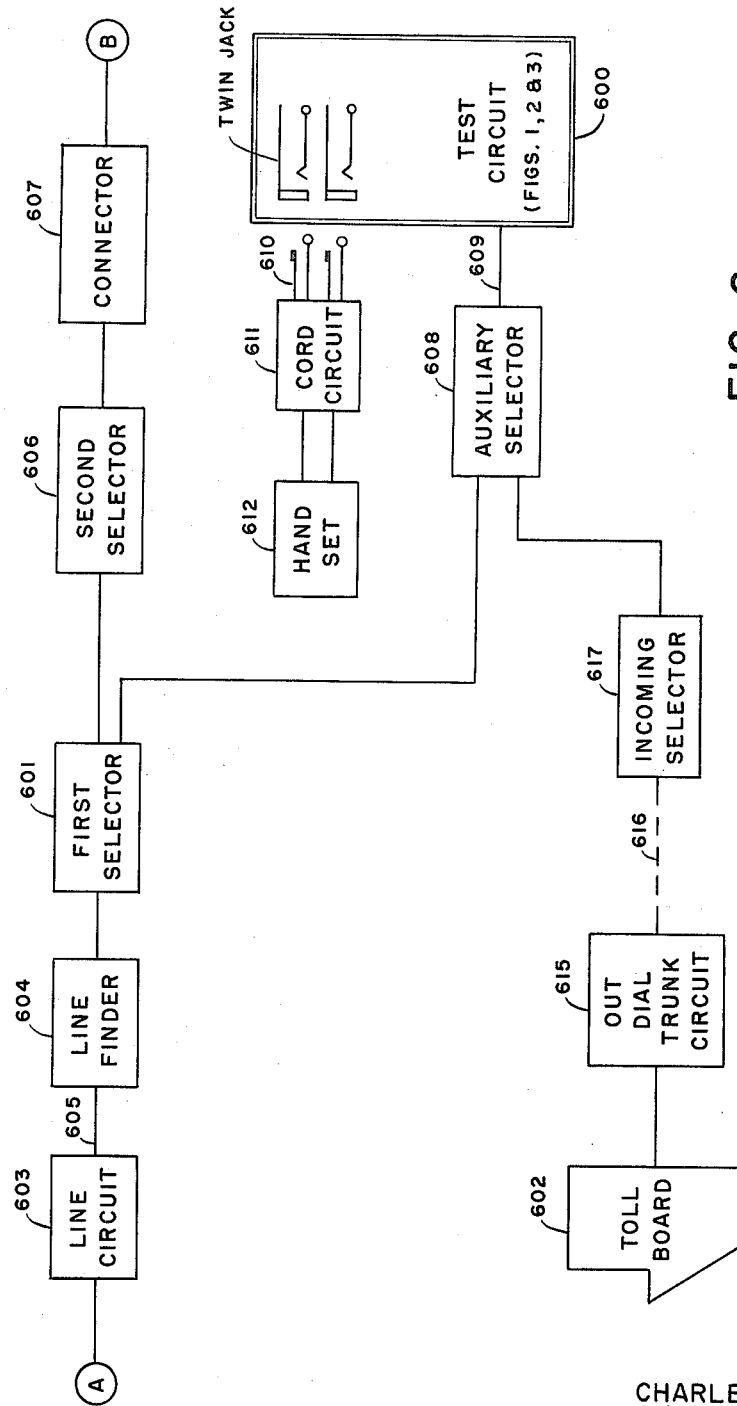

United States Patent Office 2,730,578
Patented Jan. 10, 1956

2,730,578

IMPULSE TESTING EQUIPMENT

Charles R. Fisher, Rochester, N. Y., assignor, by mesne assignments, to General Dynamics Corporation, a corporation of Delaware Application June 25, 1952, Serial No. 295,517

10 Claims. (Cl. 179—175.2)

This invention relates to testing equipment and has for its main object the provision of a rapid, accurate and simple testing and indicating means for use with such equipment.

Certain electrical equipment is conventionally designed to be controlled by D. C. pulses. For example, an automatic telephone system often is arranged to count the number of impulses in each of various sequentially occurring pulse trains. The information derived from this counting process is then utilized for the purpose of controlling the completion of a connection from a calling point to a desired called point. The design of almost any manufactured article is such that it must operate within fixed limits of design tolerance; for example, in the case of pulse controlled machinery, the design tolerance requires the pulses to have certain characteristics if those pulses are to be effective. That is, the pulses must have certain duration and must recur cyclically within a certain time period, this characteristic commonly being called the "speed." Furthermore, the relationship between the make and break (stated otherwise, off and on) portions of the pulse cycle should be in a definite ratio.

The example selected above, namely, an automatic telephone system, is for convenience. It should be obvious that the same conditions would hold true with other types of pulse controlled equipment.

An object of this invention is to provide an improved means for testing the characteristics of control pulses.

Another object of the present invention is to provide, in a telephone system, testing apparatus which is operative under the control of a calling station to test both the dial speed and the impulse ratio by means of testing apparatus located in the central office. It is contemplated that the testing apparatus may be located at a test desk or it may be a protable unit which may be readily moved from one location to another for connection as required.

An additional object of the present invention is the provision of means for readily making checks, tests and calibration of the apparatus of the testing equipment.

Still another object of the present invention is the provision of a single indicating device, such as a vacuum tube voltmeter, for indicating the characteristics of individual pulses in a pulse train.

A further object of the present invention is the provision of a storage of the characteristics of each pulse of the series transmitted so that these characteristics may be read later by a suitable measuring device.

A further object is the provision of a new and improved speed test arrangement.

Yet another object is to provide a more reliable ratio test by providing a meter preset which is held over slightly into the test period.

A further object of the invention is to provide improved testing apparatus which is of simple construction and arrangement and which is economical to manufacture and thoroughly reliable in operation.

Other objects and features of the invention will be in part pointed out in a detailed specification which follows and in part apparent from the following brief description.

Fig. 6 is a block diagram of a system which is adapted to use applicant's test circuit.

Figure 1:
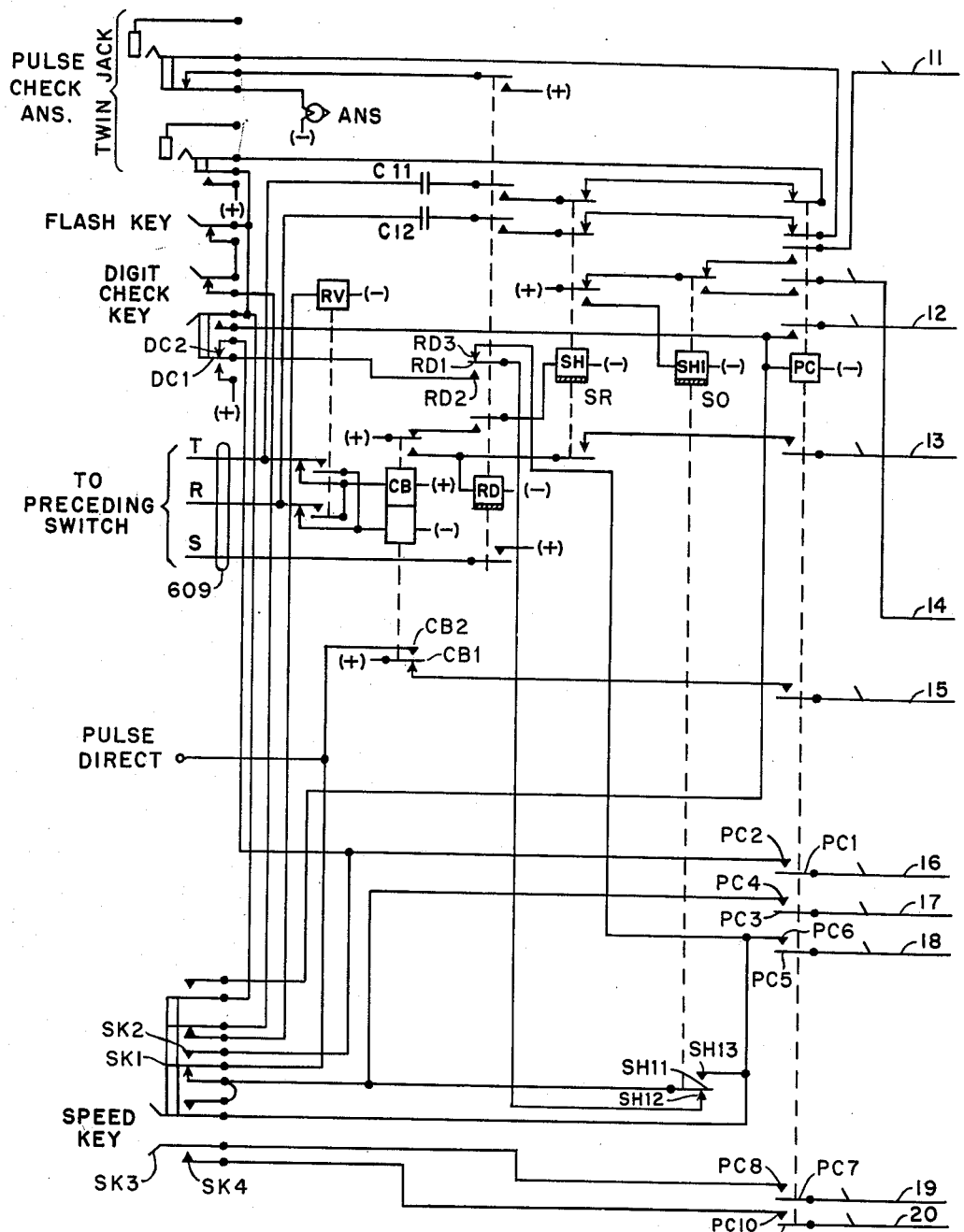
Fig. 1 is a trunk circuit used to terminate lines T, R and S which may be seized by a conventional switch train or by an operator as indicated in Fig. 6.

In an effort to give a more complete disclosure, applicant has shown the values of various components used in his system; however, these values are for illustration only and are not to be construed as necessarily the only ones which may be used.

For convenience in description, the features of the present invention are illustrated as being incorporated in an automatic telephone system shown in block diagram in Fig. 6 comprising a central office having the testing apparatus 600 selectable from an automatic switch 601 in the system or selectable from a manual position such as toll board 602, for example. That is, subscriber A may call subscriber B by removing the hand set at substation A to operate line circuit 603 which starts finder 604 to seize line 605. Subscriber A receives dial tone from first selector 601 whereupon he dials the proper digits to direct first selector 601, second selector 606 and connector 607 which operates to seize called subscriber B. On some occasions, such as when subscriber A's phone is installed, for example, it may become necessary to test the dial to determine whether it has the necessary characteristics. To make this test, someone at substation A places a call in much the same manner as in the case of a call to subscriber B; however, this time the calling subscriber at station A dials the necessary number to cause first selector 601 to seize test circuit 600 by way of auxiliary selector 608 and line 609. A signaling device in test circuit 600 operates to attract the attention of a test man who responds by inserting plug 610 of cord circuit 611 into the twin jack thus connecting his hand set 612 whereby a conversation connection is completed between the test man and the calling substation. The test man may now instruct the calling party to transmit test digits which are tested by test circuit 600.

Test circuit 600 may also be seized from toll board 602 by way of out dial trunk circuit 615, trunk 616, incoming selector 617, auxiliary selector 608 and line 609. After this the test continues as in the case of a call from subscriber A.

Briefly, applicant's device 600 is arranged in the manner shown in detail in Figs. 1, 2 and 3 to receive control pulses over line 609 alternately to operate relay CB of Fig. 1 which in turn repeats these pulses to a set of ten capacitors shown in Fig. 3 where each pulse is stored individually so that it may be examined later. This is desirable since it is possible to read the duration of each pulse in terms of the length of time during which each of the pulses built a charge on a capacitor because then this reading may be taken in a leisurely manner; whereas if no storage were provided, it would be nearly impossible to determine the character of each pulse because of its rapid occurrence (10 pulses per second). Relay CB also repeats the pulses directly to a meter MA which is adapted to read both the speed and the ratio of the pulses.

Testing the pulse speed requires the alternate charging and discharging of two capacitors C13 and C14. This charging current begins with a surge which causes an initial deflection of meter MA, hereinafter called a speed kick. Such a kick is not desirable since first it causes a delay in reading the meter and second it may result in a false reading.

In the case of a ratio test, it is necessary to deflect the meter nedle initially to a midscale reading. Otherwise the inertia of the meter may prevent the registration of a stable condition before the expiration of the digit train. In this case, it is necessary to remove the preset before the ratio test may be read. Usually this removal of the preset causes the meter needle to be deflected falsely from the preset position toward a normal position before the first pulse is received. This false reading is hereinafter called a ratio kick.

Applicant's device provides means for avoiding a speed kick and a ratio kick. The speed kick is prevented by providing the inductance of the winding of relay PS in the circuit including meter MA and capacitors C13 and C14, the inductance being sufficient to off-set the surge current which initially charges the capacitances C13 and C14. The ratio kick is avoided by the simple process of making the operate time of relay SH1 slow enough to hold the preset until the instant when the first pulse is effective to deflect the meter itself instead of when the first pulse is received at relay CB by the equipment shown.

In Fig. 1, the equipment illustrated is individual to a trunk circuit which may be selected by an automatic switch 608. When auxiliary selector 608 seizes line 609, a circuit is completed for lighting lamp ANS thereby to summon a test man who answers the incoming call by inserting plug 610 in the twin jack, thus connecting the test man's cord circuit 611 and hand set 612 to the calling station connected to Fig. 1 by way of conductors T, R and S of line 609. If the call had been by way of an operator position instead of an automatic switch, it may now become necessary to recall the operator by a means somewhat similar to the well known hookswitch jiggle; therefore a flash key is provided for signaling the calling operator's position by intermittently operating reverse relay RV thus flashing the usual operator supervisory lamp.

On answering, the test man may adjust his equipment by means of a key operation depending upon the particular test to be made. For example, he may operate the speed key for placing the apparatus in condition to utilize the impulses transmitted during a speed test, or he may restore the speed key and operate the digit check key for making the percent make-break test. In either case, a three-wiper minor switch, comprising stepping magnet XM, release magnet ZM, wipers 1W, 2W and 3W and off-normal contacts 1ON and 2ON, is provided for recording the pulses received over the calling line by storing these pulses on a series of ten capacitors, C1–C10, illustrated in Fig. 3. These capacitors are normally short circuited through break contacts of relay CS; however, during testing this relay operates to remove the short circuit. The stepping switch responds to each of the pulses so that on each step a circuit is completed for charging one of the capacitors to a value determined by the length of the pulse. Three vacuum tubes, together with the associated power transformer and components shown in the lower portion of Fig. 3, constitutes a two stage vacuum tube voltmeter which may be used successively during a test to read the charge on each capacitor.

Figures 4, 5:
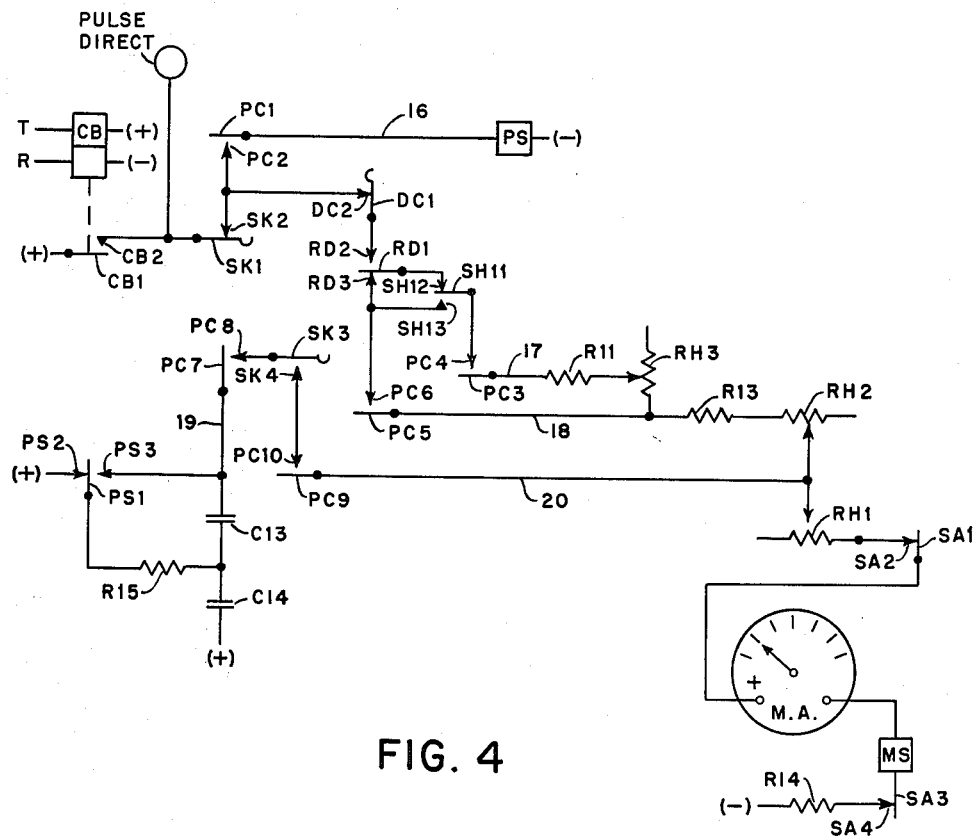
Fig. 4 shows in disconnected contact form some of the major features of applicant's invention. The circuit shown, insofar as it goes, is identical with that shown in Figs. 1, 2 and 3.
Fig. 5 shows a layout of how the various figures are to be arranged. When so joined, a complete testing unit is shown.

The pulsing circuit controlled by relay CB also connects directly to a meter MA so that a reading may be had simultaneously with the receipt of the pulses. In the event that such a simultaneous reading is taken, capacitors C13 and C14 are alternately charged and discharged at armature PS1. The initial charging current is extended to meter MA where normally the needle is deflected by a surge current in a speed kick. However, applicant avoids such a kick by placing the inductance of relay PS in parallel with meter MA. Fig. 4 shows the circuit necessary to prevent this speed kick. Armature SH11 does not operate to open the circuit to meter MA at contact SH12 until sufficient time has elapsed to complete the operation of all necessary equipment in the test unit. It should be understood that in case a ratio test is to be made, the portion of the circuit including armature SH11 and contact SH12 is also a part of the preset circuit; hence delay in operating this armature prevents the characteristic ratio kick.

With the above explanation of the equipment, it is thought that the operation of the system will best be understood by explaining in detail the step by step circuit operations effected, beginning when the trunk circuit of Fig. 1 has been seized from a calling station. At this time, the vacuum tubes shown in the lower portion of Fig. 3 will be in operative condition due to a previous connection between the supply plug and a suitable power source (not shown).

On seizure, a circuit is closed over incoming conductors T and R to operate relay CB. This circuit extends from (+), through the upper winding of relay CB, break contact of relay RV, tip conductor T, over the preceding circuits which provide a closed path to ring conductor R, and on from conductor R by way of break contact of relay RV and the lower winding of relay CB to (−). On operating, relay CB closes an obvious circuit for operating relay RD which in turn connects (+) to incoming sleeve conductor S for holding the preceding switching equipment and for making this circuit busy to other calls. Relay RD also closes a circuit for lighting signal lamp ANS, this circuit extending from (+), make contact of relay RD, break contact of the pulse check answering jack and lamp ANS to (−). Responsive to the lighting of lamp ANS, the test man proceeds to answer the call by inserting the plug of his cord circuit into the twin jack. The circuit to lamp ANS is now opened at break contact on the upper of the twin jacks for extinguishing this lamp. Insertion of the test man's answer plug in the lower of the twin jacks also completes a circuit from (+) by way of a plug operated contact on this jack, through contacts of the flash key, the digit check key and the speed key and the winding of relay RV to (−). Relay RV operates to reverse the battery connection which extends through the windings of relay CB and then back over the T and R trunk conductors to provide answering supervision in the event that this call was originally placed by way of a manual position, such as toll board 602, for example.

A talking circuit is now completed between the test man's hand set and the calling line which originally seized the test equipment by way of line 609. This talking circuit may be traced from conductors T and R through capacitors C11 and C12, make contacts of relay RD, break contacts of relay SH, break contacts of relay PC and contacts of the twin jack to the test man's cord circuit and hand set such as 611 and 612 for example.

*Speed test*

The test man may now talk with the calling party at which time let us assume that he learns that the speed of a dial is to be checked; therefore, the test man now operates the speed key. This key operation opens the original circuit to relay RV which releases to return the battery connection from relay CB to normal. A circuit is also closed by the speed key to operate relay PC over the path extending from (+) at make contact of the lower of the twin jacks, the uppermost make contact of the speed key and through the winding of relay PC to (−). The operation of relay PC opens the above described talking path to remove this circuit from the calling line during the dial test.

The test man may now find it convenient to calibrate meter MA for a speed test, for example rheostats RH1 and RH2 may be adjusted so that the needle on this meter reads 100 on the upper scale. This is the equivalent to ten pulses per second in the particular arrangement shown in applicant's drawing. The meter is energized at this time over a circuit which may be traced from (+) on armature CB1 by way of make contact CB2 of relay CB, make contacts SK1 and SK2 of the speed key, break contacts DC2 and DC1 of the digit check key, make contacts RD2 and armature RD1 of relay RD, break contact SH12 and armature SH11 of relay SH1, make contact PC4 and armature PC3 of relay PC, conductor 17, resistor R11, rheostat RH3, resistor R13, rheostat RH2, rheostat RH1, break contact SA2 and armature SA1 of relay SA, operating coil of meter MA, winding of relay MS, armature SA3 and break contact SA4 of relay SA and resistor R14 to (−). It has been found that, with the resistor, rheostat and capacitor arrangement illustrated in connection with meter MA, the meter will record the speed of the impulses on the upper scale when these impulses are transmitted from the calling station.

When relay PC operated, it also completed a circuit for energizing relay CS to cause this relay to operate thereby removing the shunt which its contacts normally maintain across capacitors C–1 to C–10 to prepare for registering and storing each incoming pulse. Relay CS is operated over a circuit extending from (+) on armature CB1 through make contact CB2 of relay CB, over the circuit just traced to relay PC and then over make contact of relay PC, conductor 12, conductor 31 and winding of relay CS to (−).

The test man's operation of the speed key after he talked with the calling party also closed a circuit for operating relay PS to prepare for the speed test which is to follow. This operating circuit may be traced through Figs. 1 and 2, or reference may be had to Fig. 4 where the same operating circuit is shown separately, in either case it extends from (+) on armature CB1 and make contact CB2 of relay CB, make contacts SK1 and SK2 of the speed key, make contact PC2 and armature PC1 of relay PC, conductor 16 and the winding of relay PS to (−).

The various circuits are now in a condition such that the calling party may transmit a train of test pulses, for example, he may dial "0" from a standard telephone dial which is to be tested, thereby transmitting ten impulses from that particular dial to indicate its speed to the test man. At the beginning of the first pulse (open condition of the impulse contacts at the dial under test) the line circuit which completes a loop from conductor T to conductor R is opened thereby to release relay CB. At the end of the first pulse in the test train, the impulsing contacts of the dial under test are once again closed to complete the loop extending from conductors T and R, thus re-energizing relay CB to mark the end of the first pulse, to the equipment shown in applicant's drawing. In a similar manner, relay CB follows each of the dial pulses which will be a total of ten in number since it was assumed above that the train of test pulses was an "0" transmitted from a standard telephone dial.

It will be seen that pulse speed relay PS releases each time relay CB releases and operates each time relay CB operates since relay PS is connected to the lowermost make contact of relay CB. Relay PS, in repeating the dial pulses, alternately shunts capacitor C14 (at the release of relay PS) and capacitor C13 (at the operation of relay PS) both of which are connected to meter MA—see Fig. 4, the circuit from (+) through capacitors C14 and C13, conductor 19, armature PC7, contact PC8, speed key contacts SK3 and SK4, contact PC10, armature PC9, conductor 20, rheostat RH1, contact SA2, armature SA1 to the (+) terminal of meter MA. Consequently, meter MA will register the current in the above described circuit in accordance with the speed of the PS relay contact. With the above mentioned calibration, the needle of meter MA will remain at point 100 on the upper scale when the speed of the dial impulses is ten per second. Lower speeds will drop the needle to a corresponding point on the upper scale while higher speeds will advance the needle to a point in accordance with the speed in excess of ten impulses per second.

Referring to Fig. 4 with the explanation of preceding paragraph in mind, it will be seen that the speed meter arrangement is essentially a capacitor charging scheme whereby the faster armature PS1 moves, the greater will be the current flow to meter MA. As is well known, a capacitor begins to charge with a surge of current and when once charged, the current drop off to about zero. The standard speed meter, such as I show, functions in a similar manner except that after an initial surge caused by a combination of the surge and the preset, the current flow drops to cause a steady meter reading which is a function of the speed of armature PS1. The initial surge normally would cause the meter needle to register a speed kick which might give a false reading.

This invention is arranged to eliminate the speed kick by providing a relay having a winding of inductance sufficient to nullify the surge current. More specifically, relay PS is connected in parallel with meter MA in the circuit extending from battery through relay PS, over conductor 16, operated armature PC1, contact PC2, digit check key contacts DC2 and DC1, make contact RD2, armature RD1, break contact SH12, armature SH11, make contact PC4, armature PC3, conductor 17, resistance R11, rheostat RH3, resistance R13, rheostat RH2, conductor 20, armature PC9, make contact PC10, speed key contacts SK4 and SK3, make contact PC8 and armature PC7, conductor 19, capacitors C13 and C14 to (+). The parallel circuit from the meter may be traced back over the path just followed which extends from (+) at capacitors C14 and C13 over various contacts and conductors 19 and 20 to a point between rheostats RH2 and RH1. From this point the parallel path continues over rheostat RH1, break contact SA2 and its armature SA1 to the (+) side of meter MA, through the meter to relay MS, armature SA3, its break contact SA4, and resistance R14 to (−).

In review of the speed kick compensation feature, an initial preset circuit causes the energization of capacitor C13 in a circuit extending to battery by way of parallel circuits through relay PS and meter MA. When the first pulse is received, relay PS operates to attract its armature PS1 thus shorting charged capacitor C13 and charging capacitor C14. This charging of capacitor C14 begins with a surge of current which would normally cause a speed kick on meter MA since it already is deflected by the preset; however the kick does not occur since the surge current is absorbed by the inductance of relay PS.

The current received by meter MA drops to a steady state after the initial surge at which time it is desirable to remove the inductance of relay PS from the parallel circuit multiplied with meter MA. An inspection of Fig. 1 shows that when relay CB is released by the first break of the pulse train a circuit is closed at the uppermost contact of relay CB for energizing relay SH which in turn causes the operation of slow relay SH1 which, after a time sufficient to allow absorption of the speed kick, attracts its armature SH11 to break the parallel circuit extending between relay PS and capacitors C13 and C14. Relay SH operates over the circuit extending from (+) on the upper break contact of relay CB, over a make contact of relay RD, through the winding of relay SH to (−). When this relay operates, it closes an obvious circuit to operate relay SH1. Relay SH, due to its slow acting characteristics, remains operated during the transmission of the entire series of ten pulses constituting the digit "0," releasing only at the end of the tenth pulse when relay CB remains held over the loop completed by the dial springs which have ceased to pulse. Relay SH1 is locked under the control of relay SH, consequently relay SH1, due to its slow acting characteristics, will be released after a predetermined interval following the release of relay SH at the end of the series of impulses.

Figure 2:
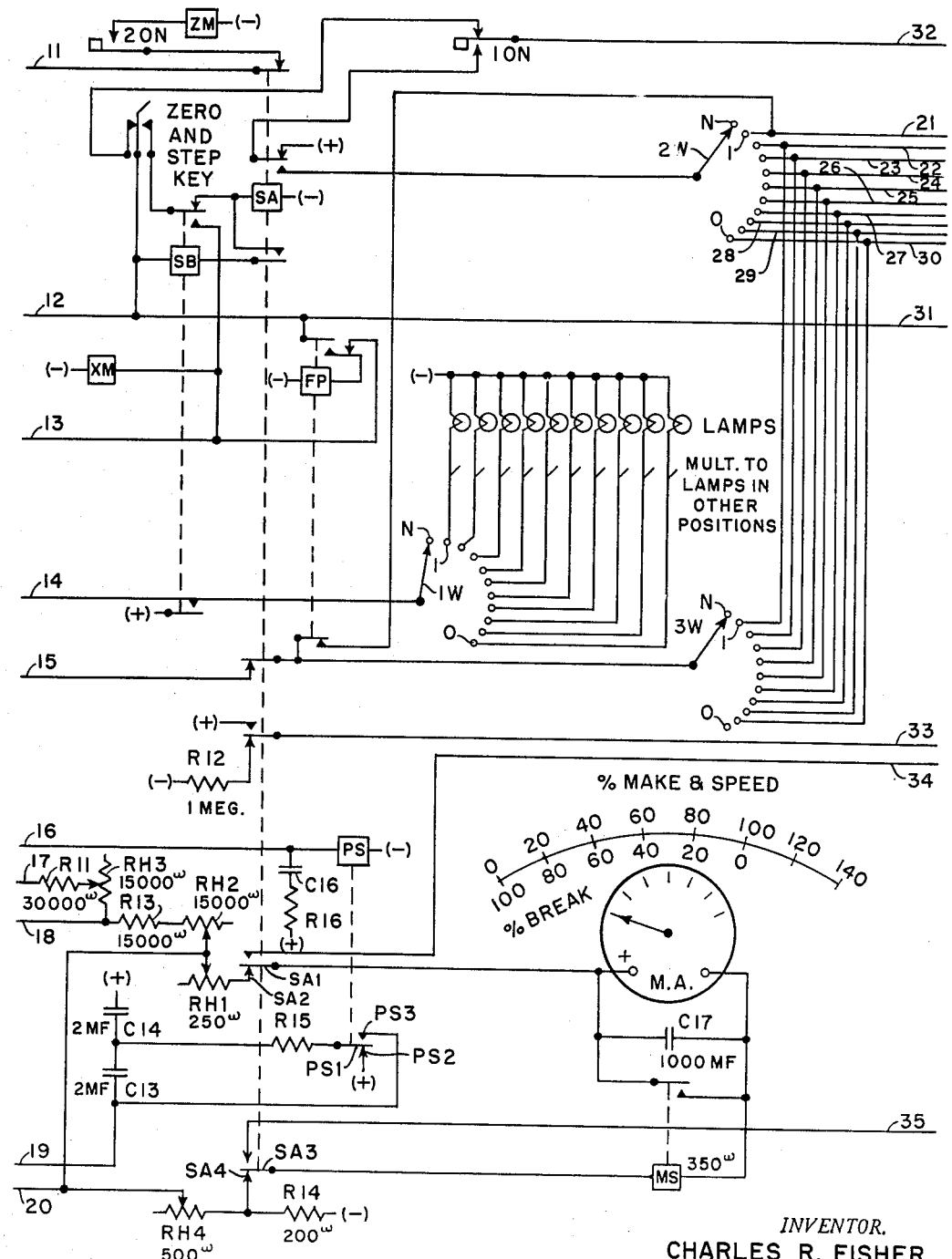
Fig. 2 shows among other things a meter used in connection with various tests which may be performed by the apparatus shown.

The digit pulses are also effective after the operation of relays SH and SH1 for operating the minor switch, of Fig. 2, thereby to store each pulse individually in the form of a charge—one pulse on each of the capacitors C1–C10; however this function is not effective in a speed test. Therefore, a complete description of this operation will be withheld until later.

*Ratio test*

At the end of the speed test, the test man restores the speed key to return the equipment to normal by releasing relays PC, CS, PS and FP. The release of relay CS again places a short circuit across capacitors C1–C10 to discharge them. The release of relay PC removes the preset on meter MA so that the needle returns to zero from its deflection to 100 on the upper scale. The release of the speed key also closes the operating circuit for relay RV which extends from ground on the lowermost contact of the twin jacks and through normal contacts on the flash and digit check key. This relay reoperates again to provide a supervision signal in case the calling party is connected by way of an operator controlled switchboard— the supervision being by way of a reverse battery which is extended back over the incoming T and R conductors to the operator. The talking circuit by which the test man and the calling party converse is again established by way of break contacts of relay PC.

The test man may now speak with the calling party at the distant point to find whether a ratio, or stated otherwise a per cent make test, is to be made at this time; if so the calling party again dials "0." As preparation for a ratio test, the test man operates the digit check key—this time the speed key is left in its non-operated position. Relay RV is released to terminate the supervision signal to the operator, if any. Actuation of the digit check key also operates relay PC over the circuit extending from (+) at the twin jack, through make contacts on the digit check key and the winding of relay PC to (−). Relay CS is again operated when relay PC closes its inner upper make contact, thus removing the shunt from capacitors C1–C10. The meter winding is again given a preset energization through operated contacts of relay PC; however in this instance, the needle on the motor is adjusted to read 40 on the upper scale, which is the normal per cent make reading. This circuit for presetting the meter may be traced from (+) on make contact of the digit check key through make contact RD2 and the armature RD1, break contact SH12 and armature SH11, make contact PC4 and armature PC3 of relay PC, conductor 17, resistor R11, rheostat RH3, resistor R13, rheostat RH2, rheostat RH1, break contact SA2 and armature SA1 of relay SA, through the meter winding, winding of relay MS, armature SA3 and break contact SA4 of relay SA and resistor R14 to (−). It will be seen that conductors 19 and 20 are not bridged at this time since the speed key is not operated, i. e., contacts SK3 and SK4 are now open. Consequently, with the values of the resistors and rheostats indicated in the drawings, the needle of the meter advances to 40 on the upper scale, thus calibrating the meter to indicate a normal 40 per cent break.

When the calling party dials "0" this second time, ten pulses are transmitted from the dial under test. As on the speed test, relay CB releases in response to the beginning of each one of these pulses and operates in response to the end of each pulse, with relays SH and SH1 being operated at the beginning of the first pulse.

The typical ratio kick is prevented by the slow operation of relay SH1 which attracts its armature SH11 thereby removing the preset which it will be recalled was extended from (+) at a make contact of the digit check key over contacts of relays RD, SH1 and PC to conductor 17 which eventually leads to meter MA. It will also be recalled that relays SH and SH1 have slow characteristics which means that the preset will not be removed for some time after relay CB released responsive to the start of the first pulse which it received over conductors T and R. If this delay were not provided, the time which it takes for the release of relay CB responsive to the first pulse to effect meter MA would cause the needle to start to return to its extreme leftmost position in a movement which applicant has called a ratio kick. Relay SH1 holds the preset circuit closed until the instant when meter MA is finally and fully influenced by the release of armature CB1. If the per cent make of the pulses transmitted by the dial under test, as repeated by armature CB1 to its make contact CB2, is less than 40, the needle will now drop below 40 while if the per cent is greater than 40, the needle will advance beyond 40 on the upper scale, thus indicating the per cent make of the ten impulses as they are received.

*Pulse storage*

An arrangement is provided to separately register and store each pulse as it is received over conductors T and R. That is a charge is built on one of the capacitors C1–C10 during the time interval measured by relay CB which drops to indicate the start of a pulse and reoperates to mark the end of that pulse. Briefly, a minor switch having three wipers 1W, 2W and 3W is adapted to step one step for each pulse as it is received. On each step a circuit is completed for storing a particular pulse on a corresponding capacitor among the group C1–C10. The charge on each of the capacitors is retained until a later time when the test man may reoperate the minor switch a step at a time to read individually each of the charges. Since the charge was a function of the time during which the contacts of relay CB were closed, the meter, which is calibrated in milliseconds, indicates the release time of relay CB occasioned by each pulse. A reading of 40 milliseconds would indicate also a 40% break of the dial actuated pulse springs since the total make-break period of the standard type which was assumed to be under test is 100 milliseconds.

More in detail, when relay CB reoperates to mark the end of the first impulse, a circuit is closed for operating relay FP which extends from (+) on make contact of relay CB, over make contact of relay SH, make contact of relay PC, conductor 13, break contact and winding of relap FP to (−); however, relay FP does not operate until after slow relays SH and SH1 have had time to operate. Minor switch stepping magnet XM is operated in multiple with relay FP. Since this operating circuit extends from contacts on the relay CB, magnet XM is operated once by each pulse successively to step the minor switch. This means that magnet XM will advance the wipers of the minor switch to a position corresponding to the number of pulses received and repeated by relay CB. For example, if only five pulses were repeated by relay CB, magnet XM would cause the minor switch to go to position 5. Relay SH is held operated during pulsing due to its slow release characteristics; however, at the end of the pulse series, it releases to open the circuit extending from (+) on contacts of relay CB over conductor 13 to magnet XM. Relay FP did not follow the pulses, since it is locked operated over a circuit extending from (+) on make contact of the lowermost of the twin jacks, over make contact of the digit check key, make contact of relay PC, conductor 12, make contact and winding of relay FP to (−).

Each of the capacitors C1–C10 are charged individually by each successive pulse as it is received from the dial under test, one capacitor being charged at each step of the minor switch. With the minor switch in its normal position and with relay CB released to mark the beginning of the first impulse, capacitor C1 is charged over a circuit which may be traced from (+) on armature CB1, over make contact of relay PC, conductor 15, break contact of relay SA, break contact of relay FP, conductor 21, resistor R1, capacitor C1, conductor 33, break contact of relay SA and resistor R12 to (−). When relay CB reoperates to mark the end of the first impulse, this charging circuit opened. It should be noted that relay FP remains unoperated until the end of the first pulse when relay CB again operates to place ground on conductor 13 by way of contacts of relays SH and PC which are now operated, thus providing an opportunity to charge capacitor C1. Relay FP now operates responsive to reoperation of relay CB to open the above-traced charging path for capacitor C1 so that subsequent pulses will not affect this charge. It also should be noted that the capacitor will retain its charge since the discharge path is now open at break contacts of relay FP. When relay CB is released to mark the beginning of the second impulse period, capacitor C2 is charged over a circuit extending from (+) on break contact of armature CB1, over make contact of relay PC, conductor 15, break contact of relay SA, wiper 3W in position 1 (since magnet XM was operated once by the first pulse to step the minor switch) conductor 22, resistor R2, capacitor C2, conductor 33, break contact of relay SA and resistor R12 to (—). When relay CB operates to mark the end of the second impulse, this charging circuit for capacitor C2 is opened. Magnet XM is again operated to advance the minor switch to position 2, thus opening the charging circuit to capacitor C2 during the remainder of the pulse train; hence capacitor C2 maintains its charge to store the second pulse.

It will be obvious from the above description and the drawing that each of the remaining pulses transmitted by way of the break contact of relay CB will be extended successively to each of the capacitor C3–C10 in turn by way of minor switch wiper 3W—one capacitor being charged by each pulse to a value determined by the time during which pulse repeating armature CB1 is in contact with its break contact.

At the end of the series of ten impulses which were transmitted when the calling party dialed "0," relays SH SH1 are released in sequence. The release of relay SH closes a circuit for lighting the tenth lamp in the series shown near the center portion of Fig. 2 as an indication of how many pulses were received. Otherwise it would not be possible to tell if all pulses which were transmitted were effective when received to operate the equipment shown. This circuit may be traced from (+) on break contact of relay SH, make contact of relay SH1 during the slow release time of this relay, make contact of relay PC, conductor 14, wiper 1W, its tenth terminal 0 and the associated lamp to (—)—assuming that the "0" which was dialled was in fact effective to step the minor switch ten steps. When relay SH1 releases, shortly after the release of relay SH, this circuit to the lamp is opened. It will be obvious that any other one of these lamps would have been flashed if the minor switch were stopped at any other step.

The restoration of relays SH and SH1 causes the minor switch to release and restore to normal by energizing release magnet ZM over a circuit which may be traced from (+) on a break contact of relay SH, over break contact of relay SH1, make contact of relay PC, conductor 11, break contact of relay SA, minor switch off-normal contact 2ON and winding of magnet ZM to (—). When the minor switch wipers are restored to normal, contact 2ON opens for de-energizing magnet ZM, thus leaving the minor switch in its normal position ready to be advanced again.

*Measuring the stored pulses*

Assume that the make-break ratio of the received pulses was not uniform and that the test man wishes to check individually each pulse of the series to determine its per cent make in terms of milliseconds. This check may be had by operating the zero and step key which in turn operates relay SB and magnet XM to step the minor switch for selecting the charged capacitors C1–C10 one at a time and for individually connecting each capacitor to the input circuit of the vacuum tube voltmeter shown near the bottom of Fig. 3. More specifically, the operation of the zero and step key closes a circuit for operating relay SA which may be traced from (+) on the lowermost make contact of the twin pack, over make contact of the digit check key, make contact of relay PC, conductor 12, make contact of the zero and step key, break contact of relay SB and through the winding of relay SA to (—). When the zero and step key is restored to normal, a circuit is closed for operating relay SB and for locking relay SA operated, this circuit being traced from the previously described (+) on conductor 12, through winding of relay SB, make contact and winding of relay SA to (—). Relay SB attracts its armature; however magnet XM is not operated at this time since its operating circuit is open at make contacts of the zero and step key. Thus, the minor switch is still in its normal position where meter MA may now be calibrated to read zero on the upper scale. This calibrating circuit may be traced from (+) on conductor 12, through break contact of the zero and step key, off-normal contact 1ON in its normal position, conductor 32 and resistor R25 to grid 5 of the first stage of the vacuum tube voltmeter. The needle of meter MA will now rest on zero on its upper scale, when so calibrated by rheostat RH-6.

When the zero and step key is operated again, a circuit is closed for energizing magnet XM, thereby to step the minor switch one step. This energizing circuit may be traced from (+) on conductor 12, through make contact of the zero and step key, make contact of relay SB and winding of magnet XM to (—). When the zero and step key is restored to normal, this energizing circuit for magnet XM is opened, thus leaving the minor switch in position 1. The input of the vacuum tube voltmeter is now connected to capacitor C1, the circuit being traced from grid 5, over resistor R25, conductor 32, operated off-normal contact 1ON, make contact of relay SA, wiper 2W in its first position indicated by the numeral "1," conductor 21, resistor R1, capacitor C1, conductor 33 and make contact of relay SA to (+). When the charged capacitor is connected to the input or control grid 5 of the vacuum tube voltmeter, the potential applied to this grid will be that potential accumulated across the capacitor terminals, this potential being a measure of the time duration of the break period of the corresponding pulse. This control potential causes a current flow in the output of the vacuum tube voltmeter which is in proportion to the potential of the grid potential and hence the charge on capacitor C1.

Figure 3:
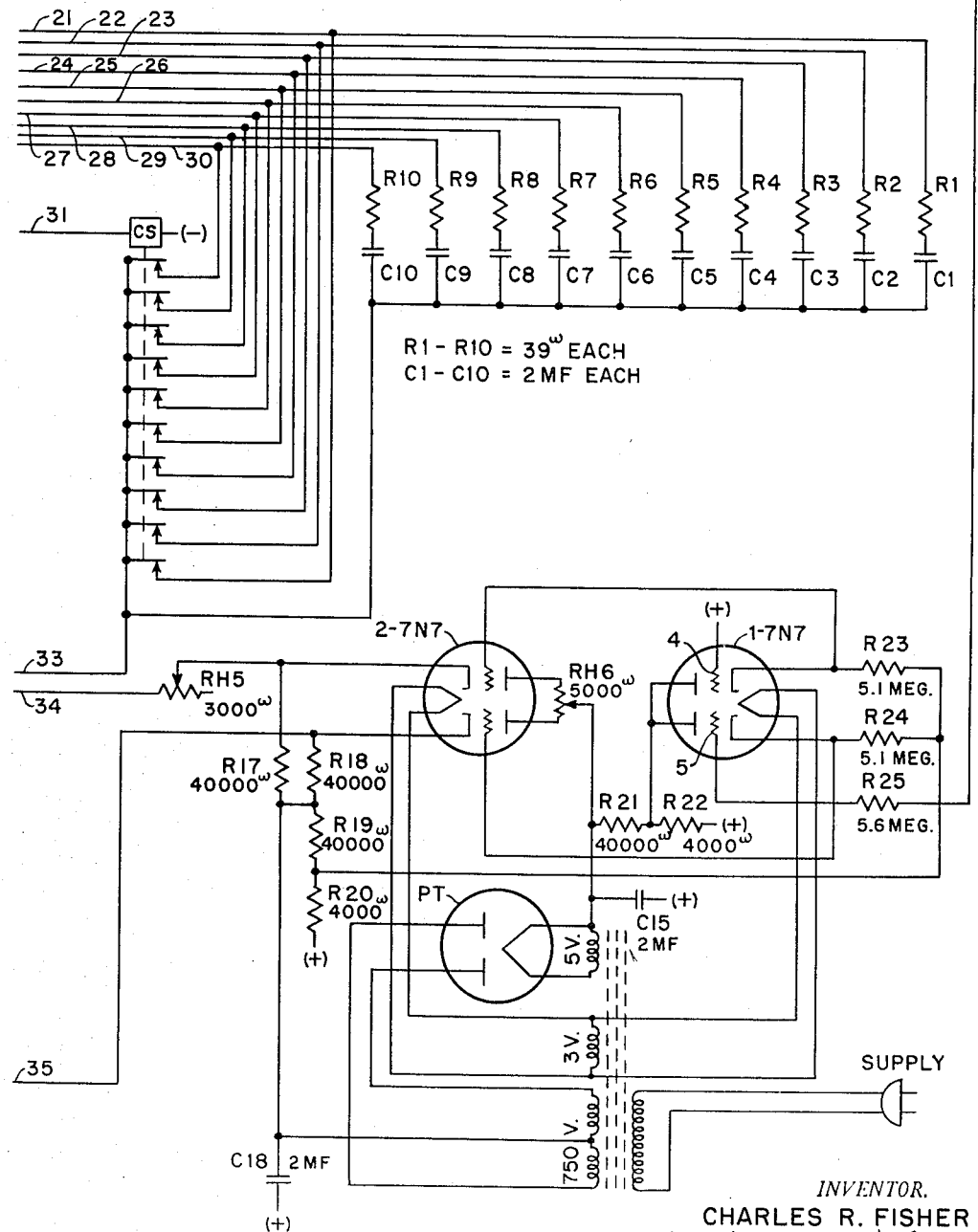
Fig. 3 shows capacitors used to store individually each pulse in a digit train and also shows a vacuum tube voltmeter.

The vacuum tube voltmeter of Fig. 3 is made linear so that any change of potential throughout the range measured by the meter will cause a uniformly linear deflection of the needle of meter MA. In the past, it often has been the practice to provide a meter having a distorted scale reading so that within the range in which changes are important, a small change will cause a large meter deflection. The provision of a linear and nondistorted scale provides a means whereby the charge on any capacitor may be read at terms of milliseconds, a measurement of the time during which relay CB was released by the break portion of each make-break. Therefore, since the operating coil of the milliammeter is connected to the output circuit of the vacuum tube voltmeter, it will be energized by a current flow which is in proportion to the control grid potential and consequently this coil actuates the needle to read the grid potential and thus the length of time in milliseconds of the break portion of the corresponding dial impulses.

Applicant's vacuum tube voltmeter is provided with a floating grid so that the charge stored on each of the capacitors C1–C10 may be read without discharge thereof. More specifically, it is found that there is no grid leak path when the input circuit is traced from grid 5 (Fig. 3), over resistor R25, conductor 32, operated off-normal contacts 1ON, make contacts of relay SA, wiper 2W in its first position indicated by the number "1," conductor 21, resistor R1, capacitor C1, conductor 33 and make contact of relay SA to (+). Thus, capacitor C1 maintains its original charge over a period which is long enough to facilitate meter reading. By comparison, each of the other grids in Fig. 3 is connected to (+) either directly or through a series of resistors. The term "floating grid" is used to distinguish the connections for grid 5 over the presence of a grid leak connection, grid 4, for example.

It is helpful for the test man to know which pulse is being read by the vacuum tube voltmeter and by meter MA; therefore, the first lamp of the series shown in the center portion of Fig. 2 is now energized over a circuit extending from (+) on make contact of relay SB, wiper 1W and lamp to (−). When the minor switch is advanced to position 2, in response to the next actuation of the zero and step key, this circuit for the first lamp is opened and a circuit for the next lamp is closed; thus each lamp serves to indicate which impulse of the series is being checked.

Each time the test man operates the zero and step key a circuit is closed to operate the stepping magnet XM which drives the minor switch forward one step. Thus, step by step each capacitor is tested and its charge is read so that the test man may determine the uniformity of the pulses, and on each step a circuit is closed to light the particular lamp which is indicative of the particular pulse being read.

It will be recalled that these capacitors were charged over a circuit including resistor R12 which is connected to the break contact of relay SA. Since this resistor is shown as approximately 1 megohm, the voltage drop across each condenser is approximately 2 per cent of the voltage of the central office battery. With the capacitors C1–C10 charged from this low voltage, it will be apparent that the curve representing the amount of charge upon the condenser will be directly proportional to the charging time and any normal variation in battery voltage will not appreciably affect the result.

When the test man has finished with the ratio test, the digit check key is restored for releasing relays PC, FP, CS, SA and SB. The release of relay CS again shunts capacitors C1–C10 for discharging the ten condensers. The test man may now talk to the calling party and either or both of the above tests may be repeated as required. When the calling party disconnects, relays CB and RD are released and the incoming sleeve conductor is disconnected from (+). When the plug is removed from the twin jack the circuits are all restored to normal.

The minor switch stays in the last position to which it was advanced because the release of relay PC opens the circuit to magnet ZM. However, when the circuit illustrated is next selected and the speed key is operated, relay PC is operated as previously described, a circuit is closed for restoring the minor switch to normal, this circuit extends from (+) on break contacts, on relay SH through break contacts on relay SH1, make contact of relay PC, conductor 11, break contact of relay SA and off-normal contact 2ON to the release magnet.

*Miscellaneous operation*

It often is desirable to measure the per cent break of a single pulse; for example, in some toll circuits a single pulse is transmitted over the trunk for ringing control, recall, supervision, or the like. Usually this single pulse must be within fairly close limits, that is, it may be long enough to control the operation or release of a relay for ringing control purposes, but not long enough to release the slow acting relay that controls the connection. For example, on calls from toll board 602, the test man may ask the operator to effect the ringing control operation (or whichever operation is involved). This transmits the single pulse over the T and R conductors and causes relay CB of Fig. 1 to be released once, after which it remains operated.

More specifically, the toll operator selects equipment 600 by means of out dial trunk circuit 615, trunk 616, incoming selector 617, auxiliary selector 608 and trunk 609, thus extending the connection to conductors T and R of Fig. 1. Relays CB and RD operate in the previously described manner. The test man answers the call, talks with the toll operator, operates the digit check key and instructs her to transmit the single pulse. Relay PC is now operated by the digit check key. When the single pulse is received, relay CB releases to operate relays SH and SH1 and step the minor switch once. Relay CB reoperates at the end of the pulse and relays SH and SH1 are released after a period determined by their slow characteristics since no further pulses are received. The minor switch is restored to normal as before leaving capacitor C1 charged in accordance with the duration of the single pulse. The test man now operates and releases the zero and step key for operating relays SA and SB, for locking relay SA and for presetting meter MA to zero as before. The zero and step key is operated a second time for advancing the minor switch one step from its normal position. When the key is released the minor switch remains in position 1, lamp 1 being then lit. Capacitor C1 is now connected to the input of the vacuum tube by way of a circuit which may be traced from grid 5, over resistor R25, conductor 32, operated off-normal contact 1ON, make contact of relay SA, wiper 2W, conductor 21, resistor R1, capacitor C1, conductor 33 and make contact of relay SA to (+). The meter now reads the charge on capacitor C1 to indicate the duration of the transmitted impulse.

Sometimes it is desirable to test an impulse producing device, such as a telephone dial, for example, when that dial is not connected to any other apparatus. For this purpose, applicant provides in Fig. 1 a connection labeled "pulse direct." The test man merely connects one terminal of the device under test to (+) and the other terminal to the connection marked "pulse direct" so that the pulsing contacts of the device under test act as armature CB1 and contact CB2. Since relay CB never comes up to operate relay RD, a circuit is provided for simulating such relay RD operation. This circuit includes armature RD1 and contact RD3.

When this equipment is used to measure, a "pulse direct" source, only a speed and a per cent make test may be completed—as applicant's circuit is now drawn. However, it is obvious that the circuit could be arranged very easily to perform all tests, to count the pulses and to incorporate compensation for both the speed kick and the ratio kick as the particular installation may require.

There are certain component parts illustrated in the drawings which are immaterial to an understanding of the present invention. These components have not been explained before; however, it may be well to explain their function briefly at this time. For example, relay MS is connected in series with the milliammeter and operates to protect this meter against excessive current flow through the circuit including the relay and the meter windings. Excessive current operates the relay, which in turn short circuits the meter winding. Capacitor C17, connected across the terminals of the meter, is a stabilizer for this indicating device. Rheostat RH5 provides a means for calibrating the meter when the circuit is first installed, after which it is left in its set position unless changing conditions make it necessary to change this calibration. Capacitor C16 and resistor R16 furnish a path for the suppression of sparks developed across contacts CB1 and CB2 as they follow dial pulses.

It should be understood that numerous modifications in the details of the circuit arrangements may be provided without departing from the scope of the invention as defined in the following claims.

What I claim is:
1. In a pulse testing device, the combination comprising; means for receiving cyclically recurring pulses, speed measuring means for indicating the speed at which said pulses recur comprising at least one capacitor, means for alternately charging and discharging said capacitor in accordance with the rate of speed of said cyclically recur- ring pulses, said speed measuring indications being subject to a period of initially distorted readings responsive to the passage of a surge current through said capacitor upon the occurrence of the first of said pulses, means comprising an inductive reactance connected to absorb said surge current for compensating for said initially distorted readings produced in said speed measuring means, and means for rendering said means comprising said inductive reactance ineffective after said period of initially distorted reading.

2. The pulse testing device of claim 1 in which said speed measuring means comprises a meter connected in series with said capacitor, and means connecting said inductive reactance in series with said capacitor and in parallel with said meter.

3. In the pulse testing device of claim 2 relay having a winding and at least one set of contacts, said inductive reactance being said relay winding and said means to alternately charge and discharge said capacitor comprising an electrical connection including said relay contacts.

4. In the pulse testing device of claim 1, comprising said cyclically recurring pulses comprising electrical pulses having at least a make portion and a break potrion, means for measuring the ratio of said make portion of said pulses to said break portion of said pulses, means for presetting said ratio measuring means to an average reading, and means for holding said last named means for a predetermined time interval thereby maintaining said preset condition on said measuring means until said means for producing pulses affects said ratio measuring means.

5. In a pulse ratio testing device, the combination comprising means for producing electrical pulses having at least a make portion and a break portion, means for measuring the ratio of said make portion of said pulses to said break portion of said pulses, means for presetting said ratio measuring means to an average reading, means for holding said last named means for a predetermined time interval thereby maintaining said preset condition on said measuring means until said means for producing pulses affects said ratio measuring means in which said holding means is a slow operate relay having contacts, and said means for presetting comprises an electrical circuit including said relay contacts.

6. In a telephone system, a device for testing digit impulses each having at least a make portion and a break portion comprising; means for measuring the speed of digit pulses, means for measuring the ratio of the make portion to the break portion of digit pulses, a capacitive reactance, an inductive reactance, a speed reading meter, said speed measuring means including means for connecting said meter in series with said capacitive reactance and in parallel with said inductive reactance, means for presetting said ratio measuring means and a slow operate means for removing said preset condition.

7. In a telephone system, a subscriber's station having an impulse transmitting means, automatic switches operatively accessible to said subscriber's station, test means which may be connected to said subscriber's station by said automatic switches, a capacitive reactance, said test means comprising a speed measuring device for alternately charging and discharging said capacitive reactance, said speed measuring device being subject to initial false readings, and inductive reactance means included in said speed measuring device for providing compensation for said initial false readings.

8. In the telephone system of claim 7, a slow operating relay having contact means, said compensating means also comprising circuit means including said contact means for rendering said inductive reactance means ineffective and means for energizing said speed measuring device and said slow operate relay responsive to the receipt of digit pulses from said impulse transmitting means, thereby rendering said inductive reactance means ineffective after the period of said initial false readings has elapsed.

9. In a telephone system, an operator toll board including means for transmitting pulses of electrical energy, automatic switch means accessible to said toll board, a test circuit which may be operatively connected to said toll board via said automatic switch means, said test circuit including means for testing pulses transmitted from said toll board, a capacitive reactance type speed measuring circuit which is subject to initial surge current, an inductive reactance and a meter, said pulse testing means comprising said inductive reactance connected in series with said capacitive reactance to absorb said surge current and in parallel with said meter, and means for breaking said series circuit after said initial surge current is over.

10. A testing apparatus comprising; a capacitor type speed measuring circuit which is subject to initial surge current, a relay having a winding, a meter means connecting the winding of said relay in series with said capacitor to absorb said surge current and said winding in parallel with said meter, and means for breaking said series circuit after said initial surge is over.

References Cited in the file of this patent

UNITED STATES PATENTS

| 1,933,274 | Ludwig | Oct. 1, 1933 |
| 2,221,591 | Lansdale | Nov. 12, 1940 |
| 2,468,696 | Westberg | Apr. 26, 1949 |
| 2,513,668 | Parker | July 4, 1950 |
| 2,552,854 | Jacobs | May 15, 1951 |
| 2,582,691 | Fritschi | Jan. 15, 1952 |
| 2,617,896 | Kessler | Nov. 11, 1952 |

OTHER REFERENCES

"Post Office Electrical Engineer's Journal," vol. 41, pps. 83 and 84, 1948.